United States Patent
Syme et al.

(10) Patent No.: US 7,346,901 B2
(45) Date of Patent: Mar. 18, 2008

(54) EFFICIENT GENERIC CODE IN A DYNAMIC EXECUTION ENVIRONMENT

(75) Inventors: Donald Robert Syme, Cambridge (GB); Andrew John Kennedy, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 408 days.

(21) Appl. No.: 10/025,270

(22) Filed: Dec. 18, 2001

(65) Prior Publication Data

US 2003/0115573 A1    Jun. 19, 2003

(51) Int. Cl.
*G06F 9/45* (2006.01)

(52) U.S. Cl. .................. 717/148; 717/108; 717/116

(58) Field of Classification Search ............ 717/108, 717/140, 153, 148, 146, 151, 129, 131, 104
See application file for complete search history.

(56) References Cited

U.S. PATENT DOCUMENTS

| | | | | |
|---|---|---|---|---|
| 5,093,914 | A | * | 3/1992 | Coplien et al. ............ 717/129 |
| 5,628,016 | A | * | 5/1997 | Kukol ....................... 717/140 |
| 5,748,966 | A | * | 5/1998 | Sato .......................... 717/131 |
| 6,269,473 | B1 | * | 7/2001 | Freed et al. ............... 717/104 |

OTHER PUBLICATIONS

"Parameterized Types in Java" by Andrew C. Myers and Joseph A. Bank, MIT Laboratory for Computer Science, Aug. 15, 1996.

"Parametric Polymorphism in Java through the Homogeneous Translation LM: Gathering Type Descriptors at Load- Time" by Mirko Viroli and Antonio Natali, DEIS Technical Report No. DEIS-LIA-00-01, LIA Series No. 41, Apr. 1, 2000, Universita degli Studi di Bologna.

"Parametric Polymorphism for Java" by Derek Rayside, University of Waterloo, IBM Centre for Advanced Studies, Aug. 29, 2000.

"Behold the Power of Parametric Polymorphism" by Eric Allen, JavaWorld, Feb. 1, 2000.

* cited by examiner

*Primary Examiner*—Tuan Dam
*Assistant Examiner*—Michael Yigdall

(57) ABSTRACT

Efficient and flexible support for parametric polymorphism in a dynamic execution environment is provided. The addition of efficient parametric polymorphism in a dynamic execution environment expands the support of features of various source languages in intermediate language code. Dynamic allocation of typing context data and support tables at runtime optimizes memory requirements and performance in a dynamic execution environment. As typing-context-relevant-code-points are executed within the program, indices are assigned to these code points and indexed slots in appropriate typing context data structures are allocated. As a typing-context-relevant-code-point is executed within a typing context, the indexed slot within the associated typing context data structure is filled in with typing context data. Such populated slots may be reused in subsequent execution of the code point within the same typing context to avoid re-computing the typing context data.

16 Claims, 9 Drawing Sheets

EFFICIENT GENERIC CODE IN A DYNAMIC EXECUTION ENVIRONMENT

TECHNICAL FIELD

The invention relates generally to computer programming principles and tools, and more particularly to efficient execution of generic code in a dynamic execution environment.

BACKGROUND OF THE INVENTION

Software development continues to evolve through stages of increasing sophistication to accommodate the needs of developers, users, and system configurations. Early programs were written directly into machine code (i.e., program code that a hardware platform could execute). More recently, a programmer can generate source code in one or more source code languages, compile the source code into object code, and link the object code into executable or machine code. Such evolution of software technologies continues into new areas, particularly with the availability of dynamic runtime environments.

In a shift away from the traditional programming approaches, dynamic runtime environments have presented improved opportunities for the implementation and inter-operation of multiple source languages by blurring the division between compile-time and run-time. For example, a dynamic runtime environment may execute programs originating from multiple source code languages by compiling the original source code into a platform-independent intermediate language. The intermediate language code can then be executed within the dynamic runtime environment on a given hardware platform, with or without a compilation of the intermediate language code into executable code. Compiled code typically achieves faster execution speeds.

One objective of dynamic runtime environments is to support as much functionality of the original source code languages as possible. Ideally, a dynamic execution environment and the associated intermediate language would support any possible feature (e.g., an operation, type, or control flow construct) of any source code language. However, complete global language support has not yet been attained.

One problem with existing dynamic runtime environments is the lack of efficient support for parametric polymorphism, in which a routine or class is parameterized by one or more type parameters. In a contrast to subtype polymorphism, which is useful for defining generic behavior over a set of related types, parametric polymorphism is useful for defining generic behavior where the type parameters need not be related within the type hierarchy. An example of parametric polymorphism in a source code language is demonstrated by templates in the C++ programming language.

In one existing approach to parametric polymorphism, a compiler/linker detects a polymorphic method or class in the source code and generates distinct instantiations of the polymorphic method or class for each type parameter at compilation/link time (a process known as "specialization"). For example, if "array<T>" is a parameterized type, it may be compiled and linked as both an "array<int>", an array of integers, and as an "array<char>", an array of characters. Regardless of whether both an "array<int>" and an "array<char>" are actually operated on during execution, the specialized code is generated to support an array type for each type of element defined in the program. Drawbacks to this approach include code explosion, a lack of support for truly separate compilation, and the lack of support for dynamic linking.

Dynamic execution environments have certain characteristics that have presented obstacles to the efficient support of parameterized polymorphism, including lazy loading and analysis of code for polymorphic classes and methods (i.e., generic code), sharing of code among one or more typing contexts, polymorphic recursion (wherein type parameters may be nested so that parameterized classes may use themselves recursively as larger types than those provided as arguments) and dynamic generation of replacement generic code for existing methods or new methods with generic classes. Furthermore, existing approaches for implementing parametric polymorphism have limitations (e.g., static pre-allocation of compilation data structures) that preclude efficient solutions in a dynamic execution environment.

SUMMARY OF THE INVENTION

Embodiments of the present invention solve the discussed problems by dynamically providing a typing context for execution of each operation that involves parametric polymorphism. The typing context for each polymorphic expression is characterized using a dynamically allocatable runtime type descriptor (RTD) that records the exact type of an associated generic type.

The RTDs associated with a given open-type expression are accessible via a typing context handle (TCH) that records the typing context in which the expression is executing. The dynamic allocation of RTDs allows for an arbitrary number of RTDs and supports multiple machine code forms for the intermediate language code. In contrast to previous approaches that employ statically allocated RTDs, dynamically allocated RTDs need not be allocated for parameterized objects defined in unexecuted code.

In implementations of the present invention, articles of manufacture are provided as computer program products. One embodiment of a computer program product provides a computer program storage medium readable by a computer system and encoding a computer program that dynamically generates typing context data associated with a typing-context-relevant-code-point being executed within a typing context in a dynamic execution environment. Another embodiment of a computer program product may be provided in a computer data signal embodied in a carrier wave by a computing system and encoding the computer program that dynamically generates typing context data associated with a typing-context-relevant-code-point being executed within a typing context in a dynamic execution environment.

The computer program product encodes a computer program for executing on a computer system a computer process for dynamically generating typing context data associated with a typing-context-relevant-code-point being executed within a typing context in a dynamic execution environment is provided. The typing-context-relevant-code-point is encountered in the typing context during execution of the program. A typing context handle associated with the typing context is identified. The typing context handle references a typing context data structure associated with the typing context. The typing context data associated with the typing-context-relevant-code-point is computed. A field is allocated in the typing context data structure associated with the typing-context-relevant-code-point. The typing context data is recorded in the field of the typing context data structure.

In another implementation of the present invention, a computer program product encodes a computer program for executing on a computer system a computer process for accessing typing context data associated with a typing-context-relevant-code-point being executed within a typing context in a dynamic execution environment. The typing-context-relevant-code-point is encountered in typing context during execution. A typing context handle associated with the typing context is identified. The typing context handle references a typing context data structure associated with the typing context. The typing context data associated with the typing-context-relevant-code-point is retrieved from the typing context data structure.

In another implementation of the present invention, a method of dynamically generating typing context data associated with a typing-context-relevant-code-point being executed within a typing context in a dynamic execution environment is provided. The typing-context-relevant-code-point is encountered in the typing context during execution of the program. A typing context handle associated with the typing context is identified. The typing context handle references a typing context data structure associated with the typing context. The typing context data associated with the typing-context-relevant-code-point is computed. A field is allocated in the typing context data structure associated with the typing-context-relevant-code-point. The typing context data is recorded in the field of the typing context data structure.

In yet another embodiment of the present invention, an execution engine for executing parametrically polymorphic code is provided. The execution engine dynamically generates typing context data associated with a typing-context-relevant-code-point being executed within a typing context in a dynamic execution environment. A read module encounters the typing-context-relevant-code-point in the typing context during execution of the program. A handle module identifies a typing context handle associated with the typing context. The typing context handle references a typing context data structure associated with the typing context. A computation module computes the typing context data associated with the typing-context-relevant-code-point. An allocation module allocates a field in the typing context data structure associated with the typing-context-relevant-code-point. A recording module records the typing context data in the field of the typing context data structure.

In yet another embodiment of the present invention, a computer readable medium storing a data structure for defining an exact type associated with a typing-context-relevant-code-point within an instance of a generic class during execution in a dynamic execution environment is provided. A virtual table data portion is associated with the generic class. A typing context portion is associated with the generic class. The typing context portion is accessible through the virtual table portion and having one field storing an exact type associated with the typing-context-relevant-code-point.

These and various other features as well as other advantages, which characterize the present invention, will be apparent from a reading of the following detailed description and a review of the associated drawings.

DETAILED DESCRIPTION OF THE INVENTION

Figure 1:
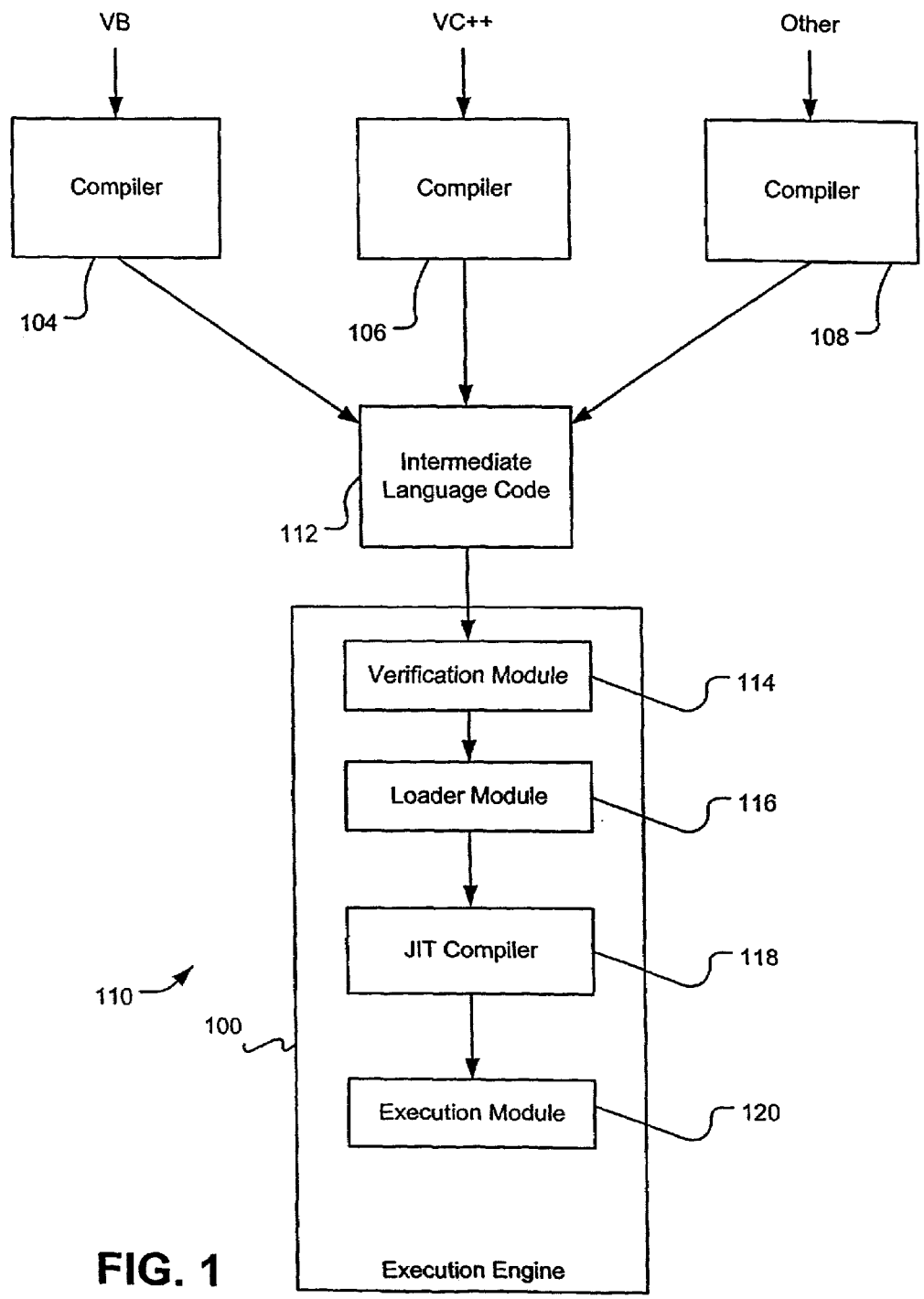
FIG. 1 illustrates an exemplary dynamic execution environment in an embodiment of the present invention.

Embodiments of the present invention solve the discussed problems by dynamically augmenting a typing context (TC) data structure with extra slots that record TC data for each "open-type" expression executed in a program. Typing context refers to the type associated with the execution path in which the expression executed. An open-type expression is an expression that is defined with type variables (e.g., "<T>"), such as (1) an expression within an instruction sequence that allocates an object of a generic class (e.g., the expression C<T> within the instruction "new C<T>", where <T> is a type variable); (2) an expression within an instruction sequence that checks the exact type of a generic object (e.g., "if (a is Data<Pair<T>>) then . . . "); and (3) an expression within an instruction sequence that represents a generic method call (e.g., "Routine<T>( . . . )"). Note that the exact type associated with an object of a generic class is characterized using a dynamically allocated version of a runtime type descriptor (RTD). The RTDs associated with a given "open type" expression are accessible via slots (or fields) attached to the typing context (TC) data structure that describes the typing context in which the "open type expression" is executing and which is itself accessible via a typing context handle (TCH) from the current execution environment at the point where the "open type expression" is required. RTDs themselves are dynamically allocated as new RTDs are required. This allows for dynamic loading of new modules that use previously undiscovered RTDs. In addition, the slots associated with the TC data structure are also dynamically allocated as new "open type expressions" are discovered and required. The dynamic allocation of slots for "open type expressions" allows for an arbitrary number of "open type expressions". In contrast to previous approaches that employ statically allocated RTDs and/or statically allocated slots for "open type expressions", dynamically allocating RTDs and slots means that RTDs and slots need not be allocated for parameterized objects defined in unexecuted code.

Open-type expressions are referred to as "typing-context-relative-code-points" or "TC-relevant-code-points" within a program. For example, an expression allocating an object of a generic type or performing a type test on an object against a generic type rely on accessing the RTD of the generic type.

Such expressions are called "RTD-relevant-code-points". Exemplary operations that may be executed at RTD-relevant-code points include without limitation "new", "castclass", "unbox", "ldelema", and "ldtoken", which are exemplary operations supported by Microsoft Corporation's .NET™ Common Language Runtime (CLR). RTD-relevant-code-points are mapped into a typing context data structure ("TC data structure") to an RTD describing the exact type of the generic type in the current typing context.

In contrast, a generic method call (i.e., a call to a method that accepts one or more type variable as arguments) must know the appropriate typing context for TC-relevant-code-points that execute within the method. The generic method call is referred to as a "TCH-relevant-code-point". The TCH-relevant-code-points are mapped into a TC data structure to a TCH corresponding to the typing context within the generic method. The newly identified TCH is then passed into the generic method as a hidden parameter to indicate the typing context of those operations executed within the generic method.

When intermediate language code is executed, an index is assigned to each TC-relevant-code-point. The index relates to the sequence of the execution of the TC-relevant-code point within a program. In one embodiment, as each new TC-relevant-code-point is discovered during execution, it is assigned a new index. The index is used to traverse into a TC data structure associated with the current typing context to determine the exact type of a generic type or the typing context within a generic method at the current TC-relevant-code-point.

In addition, at the instantiation of an object of a generic class, the typing context of the object is recorded in a TC data structure accessible through the object itself (e.g., through the object's pointer to its virtual table (vtable)). For example, the TC data structure may be appended to the vtable directly or through pointer indirection. In this manner, open-type expressions within the generic class of the object may determine the current typing context of the object and therefore calculate the exact type of objects allocated within the object or the typing context of generic method called within the object.

Execution of an RTD-relevant-code-point results in either the retrieval of an RTD for the object (e.g., from a global hash table of RTDs maintained by the execution environment) or in a lookup operation into the appropriate TC data structure. If the lookup operation is successful, it is significantly faster than retrieval from the global hash table. The lookup operation allows an RTD for a code point to be reused if the code point is executed multiple times in the same typing context. Likewise, execution of a TCH-relevant-code point also results in either the retrieval of a new TCH (e.g. from a global hash table of TCHs maintained by the execution environment) or a lookup operation into an existing TCH data structure associated with the TCH of the current stack frame. As with RTDs, the lookup allows a TCH for a given TCH-relevant-code-point to be reused if the code point is executed multiple times.

Note that if a TC-relevant-code-point is never executed, the TC field for the code point need not be allocated in any TC table. Likewise, if a TC-relevant-code-point is never executed in a given typing context, the TC field for the slot associated with the code point need not be computed for the TC table of that typing context.

FIG. 1 illustrates an exemplary dynamic execution environment in an embodiment of the present invention. A dynamic execution environment 110 typically includes just-in-time (JIT) compilation of intermediate language code into machine code, automatic memory management, automatic object layout, dynamic loading, reflection and exception handling facilities, although all of these features are not required in a given embodiment of the present invention. The dynamic execution environment 110 includes an execution engine 100 for executing intermediate language code 112. In one embodiment, the execution engine 100 provides a variety of runtime services, such as storage management, debugging, profiling, security, etc., and shared libraries. Furthermore, the execution engine 100 supports a type system, the core of which is the definition of classes in an inheritance hierarchy. The type system may include a collection of primitive types, arrays of specified dimensions, "structs" (i.e., structured data that is not boxed), and safe pointer types for implementing call-by-reference and other indirection-based operations. It should be understood that alternative embodiments may support more or less of these features without departing from the scope of the present invention.

The illustrated embodiment shows compilers 104, 106, and 108 receiving source code prepared in various source code languages and converting the received source code into intermediate language code 112. The compiler 104 is shown as compiling Visual Basic (VB) source code. The compiler 106 is shown as compiling Visual C++ (VC++) source code. The compiler 108 is shown as compiling source code of some other source code language (e.g., C, C#, Jscript, Ada, Haskell, Modula-3, APL, COBOL, Eiffel, Perl, Python, and Scheme). The source code languages referenced herein are provided only as examples and are not intended to limit the possible source code languages supported within the scope of the present invention.

In an embodiment of the present invention, the source code received by any of the compilers 104, 106, and 108 includes instructions and data representing a generic type or routine. The corresponding compiler generates the intermediate language code so that the generic type or routine is executed by the execution engine 100.

The illustrated execution engine 100 includes a verification module 114, a loader module 116, a just-in-time (JIT) compiler 118, and an execution module 120. The verifier module 114 evaluates the format of the intermediate language code being input to the execution engine 100 and determines whether the code is type safe. The loader module 116 receives the verified intermediate language code and resolves any dependencies (e.g., by loading code that is merely referenced in the intermediate language code but is otherwise available to the system). The JIT compiler 118 compiles the verified intermediate language code and other loaded code, if necessary, into machine code for the target platform on which the execution engine 100 runs.

In one embodiment, the JIT compiler 118 does the verification and transforms type-unsafe code to type safe code by inserting code that raises exceptions if bad code is executed. Code that raises an exception when unsafe code is encountered is considered to be type safe.

The execution module 120 executes the compiled code. As the execution module 120 encounters code representing or involving generic classes and methods (i.e., TC-relevant-code-points), the execution module 120 executes the generic code to build and access the appropriate TC data structures that correspond to the code points in a given typing context.

The exemplary compilers 104, 106, and 108 are shown to emit intermediate language code into a common intermediate language code set 112; however, in alternative embodiments, a single compiler may emit all necessary code for a given intermediate language code set, without including intermediate language code from another compiler. In addition, the intermediate language code required to implement a given operation may be generated as multiple intermediate language code sets generated by a single compiler or by multiple compilers. The execution engine 100 interprets the intermediate language code 112 for execution, or alternatively "just-in-time" compiles the intermediate language code into executable code, such as native code for a particular platform. The interpreted code or the executable code can be executed by the execution engine 100.

Each of the compilers 104, 106, and 108 and the execution engine 100 can in one embodiment be a computer program executed by a processor from a computer data signal or a computer-readable medium, such as a memory. Each of the multiple source code language sources, the intermediate language code, and the executable code can in one embodiment be stored as data in a computer-readable medium, such as a memory or a hard disk drive or embodied in a computer data signal.

In contrast to traditional whole-program-compile-and-link environments, a dynamic execution environment allows many operations to be postponed. For example, the linking of program modules is commonly delayed until the intermediate language code is executed in an execution engine. Furthermore, in a dynamic execution environment, certain expressions in a program may never be executed during a given execution of the program because the execution path bypasses the associated code. For example, an exception handling method may never be processed during execution of the program because the exception does not occur. In a dynamic execution environment, therefore, the exception handling method may never be compiled or linked into the executing program. This postponement of compilation and/or linking allows the primary support for parametric polymorphism to also be postponed until the polymorphic method is executed or the polymorphic object is created.

It is assumed that the intermediate language accepted by the execution engine has been extended to support constructs that express generic code (i.e., classes or methods that are parameterized by type variables). Operations in generic code can include primitive intermediate operations corresponding to the allocation of generic objects, loading of an RTD, execution of runtime type tests against these objects, execution of generic methods, creation of generic arrays, etc.

For a typical developer, support for parametric polymorphism introduces an expanded set of type constructors and some polymorphic static methods to help manipulate the parameterized types. A developer may generate generic code that supports an assortment of parameterized types. The generic code can then be incorporated into a program in association with one or more type parameters.

Exemplary generic code is listed below in Code Sample 1 to illustrate characteristics of an embodiment of the present invention:

---
Code Sample No. 1
---

```
Object Routine<T>(T y)
{
    Object x;
    for (int i=0; i<100; i++)
    {
        x=new Data<Pair<T>>(y);
    }
```

---
-continued

Code Sample No. 1
---

```
    return x;
}
class Data<T>: Object {
{
    public Data(T y) {x=y;}
    private T x;
}
class Pair<T>: Object
{
    public Pair(T a) {x=a; y=a;}
    private T x;
    private T y;
}
class Point: Object
{
}
void main ( )
{
    Object a = Routine<String>("a");
    if (a is Data<Pair<String>>) printf("yes!\n");
    Object b = Routine<Point>(new Point( ));
    if (b is Data<Pair<String>>) printf("yes!\n") else printf("no!\n");
}
```

---

In the main routine (lines 28-34), the terms "<String>" and "<Point>" represent type parameters specified by the developer. In line 6, the expression "=new Data<Pair<T>> (y);" represents an RTD-relevant-code-point because it creates a polymorphic object. The "<T>" represents a type variable, which is replaced by the type parameter in the appropriate typing context.

For example, the Code Sample No. 1 defines two generic classes ("Data<T>" at line 11 and "Pair<T>" at line 17), one generic method ("Routine<T>" at line 1), and one non-generic class ("Point" at line 24). In addition, lines 28-34 define a main() routine that specifies type parameters for the parameterized method calls. It should be understood that the code in the main routine does not represent generic code because it does not include an open-type expression (i.e., an expression having type variables, such as <T>).

In contrast, the method call itself results in the execution of generic code. In the main() routine, line 30 executes the generic method Routine<T>() with a type parameter "<String>" and the input parameter "a". Referring to the definition of the Routine<T>() method at line 1, the instruction on line 30 requires that the input parameter "a" be of type T (i.e., of type "String" in the first call) and that the method Routine<T>() returns an Object "a". Execution of the Routine<T>() method by the method call to "Routine<String>("a")" in line 30 causes one hundred objects of type "Data<Pair<String>>" to be created as a result of the instruction on line 6. The one hundredth object created in line 6 is then returned at line 8 and is assigned to Object "a" at line 30. At line 31, the conditional statement tests the type of object "a". Because "a" was created as a "Data<Pair<String>>" object in line 6 of the Routine<T>() method, the conditional is TRUE, and a "yes" result is printed.

Also in the main routine, line 32 executes the generic method Routine<T>() with a type parameter "<Point>" and an input parameter "new Point()". At line 24, the "Point" class is defined as a subclass of "Object". Referring to the definition of the Routine<T>() method at line 1, the instruction on line 30 requires that the input parameter "new Point()" be of type T (i.e., of type "Point" in the second call) and that the method Routine<T>() returns an Object "b".

Clearly, the input parameter "new Point()" returns a Point object for input to the method Routine<T>(). Execution of the Routine<T>() method by the method call to "Routine<String>(new Point())" in line 32 causes one hundred objects of type "Data<Pair<Point>>" to be created as a result of the instruction on line 6. The one hundredth "Data<Pair<Point>>" object created in line 6 is then returned at line 8 and is assigned to Object "b" at line 32. At line 33, the conditional statement tests the type of object "b". Because "b" was created as a "Data<Pair<Point>>" object in line 6 of the Routine<T>() method (and not as a "Data<Pair<String>>", the conditional is FALSE, and a "no" result is printed.

Before discussing an implementation that supports the parametric polymorphism of the Code Sample No. 1, it should be understood that the generic code compiled from the code sample need be generated only once in a single representation for all instantiations of a given generic type. Likewise, whenever a generic method is called, the single representation of generic code implements the method, which is passed the typing context data (or a reference thereto) that is required execute the generic method properly for the appropriate type parameter.

In addition, note that line 6 allocates an object of a nested generic type, where a type parameter of "Pair<T>" is input to the generic class "Data<T>". In the first call to Routine<T>(), the statement on line 6 will be evaluated to create an object of the type "Data<Pair<String>>". Whereas, in the second call to Routine<T>(), the statement on line 6 will be evaluated to create an object of type "Data<Pair<Point>>".

The nesting of type parameters in this manner can result in a "recursive data structure", because elements of the data structure can in principle be arbitrarily large. For example, a generic method "foo<T>()" may include a conditional code portion having the expression "return foo<Data<T>>()". It is not clear at compile time how many times the return statement will be executed. However, at execution time in an embodiment of the present invention, the TC data structures may be allocated and expanded as TC-relevant-expressions are executed. In existing approaches, recursion can lock up a compiler or loader in an execution engine because the creation of an arbitrary number of RTDs by a recursive generic expression cannot be bounded at compile or load time. However, the dynamic allocation of an embodiment of the present invention allows the allocation of the RTDs only as they are needed (i.e., as the associated expressions are executed). Therefore, the dynamic management of TC data allows sophisticated support of recursive code portions relating to generic code.

Exemplary generic code is listed below in Code Sample 2 to illustrate alternative characteristics of an embodiment of the present invention.

Code Sample No. 2

```
class Container<T>
{
    Object Routine(T y)
    {
        Object x;
        for (int i=0; i<100; i++)
        {
            x=new Data<Pair<T>>(y);
        }
```

-continued

Code Sample No. 2

```
        return x;
    }
}
class Data<T>: Object {
{
    public Data(T y) {x=y;}
    private T x;
}
class Pair<T>: Object
{
    public Pair(T a) {x=a; y=a;}
    private T x;
    private T y;
}
class Point: Object
{
}
void main ( )
{
    Container<String> c1 = new Container<String>( );
    Object a = c1.Routine("a");
    if (a is Data<Pair<String>>) printf("yes!\n");
    Container<Point> c2 = new Container<Point>( );
    Object b = c2.Routine(new Point( ));
    if (b is Data<Pair<String>>) printf("yes!\n") else printf("no!\n");
}
```

Code Sample 2 differs from Code Sample 1 in that the method Routine is called as a method of a Container object. In the main routine (lines 31-40) of Code Sample No. 2, the terms "<String>" and "<Point>" represent type parameters specified by the developer. In line 8, the expression "x=new Data<Pair<T>>(y)" represents an RTD-relevant-code-point because it creates a polymorphic object. The "<T>" represents a type variable, which is replaced by the type parameter in the appropriate typing context.

For example, the Code Sample No. 2 defines three generic classes ("Container<T>" at line 1, "Data<T>" at line 14 and "Pair<T>" at line 20) and one non-generic class ("Point" at line 24). The Container<T>class defines an instance method "Routine()", which contains generic code. In addition, lines 31-40 define a main() routine that specifies type parameters for the parameterized method calls.

In the main() routine, line 33 creates an instance "c1" of a generic class Container<T> with the type parameter <String>. Line 34 executes the instance method "c1.Routine()" and the input parameter "a". Referring to the definition of the Container::Routine() method at line 3, the instruction on line 34 requires that the input parameter "a" be of type T (i.e., of type "String" in the first call) and that the method Routine() returns an Object "a". Execution of the instance method Routine() method by the method call to "c1.Routine("a")" in line 34 causes one hundred objects of type "Data<Pair<String>>" to be created as a result of the instruction on line 8. The one hundredth object created in line 8 is then returned at line 10 and is assigned to Object "a" at line 34. At line 35, the conditional statement tests the type of object "a". Because "a" was created as a "Data<Pair<String>>" object in line 8 of the c1.Routine() method, the conditional is TRUE, and a "yes" result is printed.

Also in the main routine, line 37 creates an instance "c2" of a generic class Container<T> with the type parameter <Point>. Line 38 executes the instance method "c2.Routine()" and the input parameter "new Point()". Referring to the definition of the Container::Routine() method at line 3, the instruction on line 38 requires that the input parameter "new Point()" be of type T (i.e., of type "Point" in the second call) and that the instance method Routine() returns an Object "b". At line 27, the "Point" class is defined as a subclass of "Object". Clearly, the input parameter "new Point()" returns a Point object for input to the method c2.Routine(). Execution of the c2. Routine() method by the method call to "c2.Routine(new Point())" in line 38 causes one hundred objects of type "Data<Pair<Point>>" to be created as a result of the instruction on line 8. The one hundredth "Data<Pair<Point>>" object created in line 8 is then returned at line 10 and is assigned to Object "b" at line 38. At line 39, the conditional statement tests the type of object "b". Because "b" was created as a "Data<Pair<Point>>" object in line 8 of the c2.Routine() method (and not as a "Data<Pair<String>>", the conditional is FALSE, and a "no" result is printed.

Figure 2:
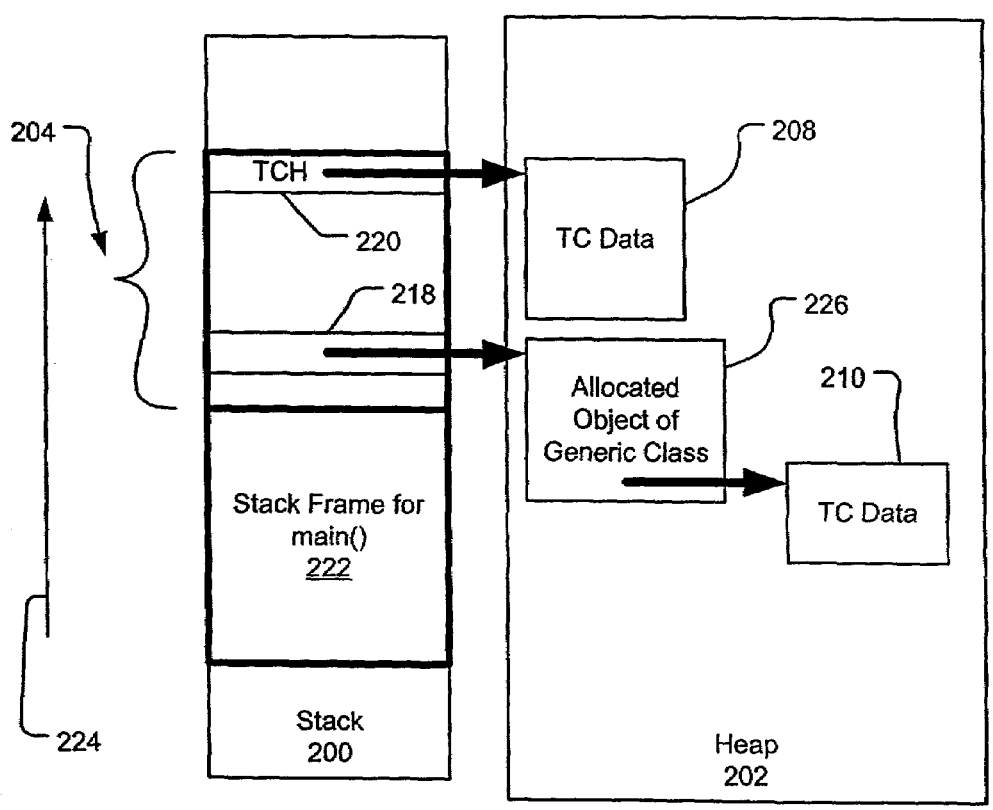
FIG. 2 illustrates a high-level representation of exemplary TC-relevant code-points in a stack and associated TC data structures in an embodiment of the present invention.

FIG. 2 illustrates a high-level representation of exemplary TC-relevant code-points in a stack and associated TC data structures in an embodiment of the present invention. A stack 200 includes a sequence of contiguous stack frames (e.g., stack frames 204 and 206) that record information about each method call during execution. For example, each stack frame may include without limitation the location of the call in the program, arguments of the call, and local variables of the method being called. The arguments of the call and the local variables may also point to objects of generic classes and non-generic classes allocated in a heap 202. In addition to the stack frame, microprocessor registers may, during the execution, contain pointers into the heap 202. An arrow 224 in FIG. 2 indicates the direction of stack growth, with the most recent stack frames on the stack being higher than older stack frames.

Referring to the Code Sample No. 1, the stack frame 206 corresponds to the main() routine, storing local variables "a" and "b" of type Object. During the execution of the main () routine, a method Routine<String>() is called at line 30, wherein <String>represents the type parameter to be used in the call to the generic method Routine<T>(). Accordingly, a TCH associated with the type parameter <String>is retrieved (e.g., from a global hash-table that maps groups of type parameters to unique TCHs) and passed into the generic method Routine<T>() as a hidden parameter. The TCH 220 for <String>is therefore recorded in the next stack frame 204, which is associated with the method Routine<T>() and the type parameter <String>. The TCH 220 references TC data structure 208, which defines the typing context data for TC-relevant-code-points in the <String> typing context. Note that in the call to Routine<Point>() on line 8, a new stack frame will be added after stack frame 222 (in place of stack frame 204). The TCH for <Point> will be passed into the new stack frame as a hidden parameter to define the typing context data for the TC-relevant-code-points in the <Point> typing context.

During the execution of the method Routine<String>(), at line 6, one hundred objects of type Data<Pair<String> are created in a loop. On the first iteration of the loop, the generic code evaluates the current TCH (i.e., the TCH for <String>) to determine whether an RTD has been created for the TC-relevant-code-points at line 6. Each TC-relevant-code-point is assigned an index at its first execution based on the code point's sequence of execution relative to other TC-relative-code-points. In the Code Sample No. 1, the code point corresponding to line 6 is the first TC-relevant-code-point executed and it is therefore assigned an index of "0". Accordingly, the generic code of the method examines the first indexed slot of the TC data structure 208 to determine whether an RTD has been computed for the code point at line 6 in the current typing context (i.e., <String>).

In the first iteration of the loop, the RTD has not been computed (e.g., the slot has not yet been allocated or the slot contains data indicating that the RTD has not yet been computed, such as NULL). Therefore, the generic code retrieves the RTD for the Data<Pair<String>> type from a global hash table of RTDs, based on the string "Data<Pair<String>>". The generic code stores the retrieved RTD in the appropriate slot in the TC data structure 208 at index 1. If the TC-relevant-code-point is executed again in the <String> typing context, the RTD need not be retrieved from the global hash table, but instead from the TC data structure associated with the code point and the <String> typing context.

In addition, after the object is allocated (see object 226), a pointer 218 in the stack frame 204 references the object in the heap 202 and a pointer in the object 226 is set to point to an appropriate slot in TC data structure 210 to indicate the typing context of the allocation (i.e., <String>). Therefore, when the one hundredth object is created and finally returned out of the <String> typing context to the calling code in line 9, the returned object "a" carries with it a pointer to the TC data structure 210. If a TC-relevant-code-point in an instance method of the object Data<Pair<String> is executed (as shown in line 8 of Code Sample 2), the generic code will access the TC data structure 210 to determine the proper typing context.

Furthermore, in alternative embodiments, the TC data structure 210 may include additional slots for other TC-relevant-code-points in the program. The slots for TC-relevant-code-points executed within the object are allocated and filled in as they are executed within the object's scope. New slots in the TC data structures are allocated as new TC-relevant-code-points are discovered during execution, although variations of incremental allocation may be employed within the scope of the present invention, such as allocating blocks of slots at one time. If an existing TC-relative-code-point is never executed, a slot need not be allocated for it. If an existing TC-relative-code-point is executed in one typing context, but not another, the slot is allocated in the TC data structure of all typing contexts, but only the RTD or TCH for the code point is only computed and recorded in the slot for the typing context in which the code point is executed.

Figure 3:
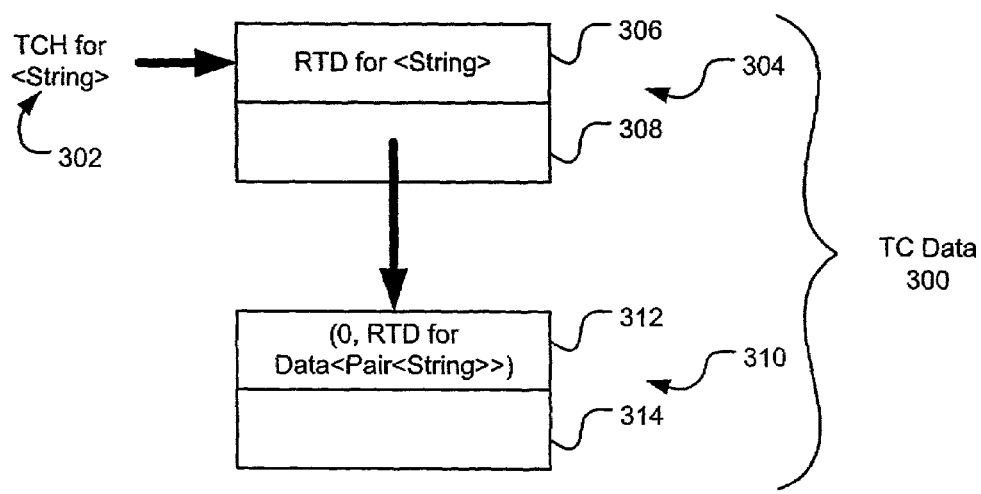
FIG. 3 illustrates an exemplary TC data structure corresponding to the <String> typing context of Code Sample No. 1 in an embodiment of the present invention.

FIG. 3 illustrates an exemplary TC data structure corresponding to the <String> typing context of Code Sample No. 1 in an embodiment of the present invention. Referring again to the Code Sample No. 1, the TCH 302 for <String>, which references the TC data structure 300, is passed into the generic method Routine<T>() as a hidden variable. The RTD stored in the first field 306 of the first (non-indexed) slot 304 of the TC data 300 structure defines the typing context of the TC data structure 300. The second field 308 of the first slot 304 references the next (indexed) slot 310 in the TC data structure 300.

The indexed slot 310 stores the RTD corresponding to the first indexed code point in the Code Sample No. 1 (i.e., at line 6). Within the <String> typing context, the RTD for the type "Data<Pair<String>>" is stored in first field 312 of the slot 310. The second field 314 of the slot 310 is used to indicate the next slot in the table; however, in the example, there are no additional TC-relevant-code-points within the <String> typing context, so the second field 314 stores NULL.

Once the second slot 310 of the TC data 300 has been generated, all subsequent executions within the <String> typing context of the corresponding code point at line 6 may reference the RTD in the TC data 300 instead of re-retrieving the RTD from the global hash table, providing a performance benefit when code points are executed multiple times (e.g., line 6 is executed 100 times in the <String> typing context in the Code Sample No. 1). See the discussion relating to FIG. 6 for more details on the reuse of RTDs.

In the illustrated embodiment, the TC data structure 300 is configured as a linked list, although other expandable data structures may be employed in alternative embodiments of the present invention, including without limitation binary trees or tables implemented using standard row-displacement and sparse array techniques. A link list structure is employed in the illustrated embodiment to allow dynamic growth of the TC data structure 300 in the <String> typing context. That is, the TC data structure 300 need not be allocated statically. Instead, each table slot may be allocated and added to the table as each new TC-relevant-code-point is discovered during execution. In addition, other dynamically extendable data structures may be employed in lieu of or in combination with a linked list, including those mentioned above, various hash tables and tree structures. Accordingly, in one embodiment of the present invention, the second slot 310 of the TC data 300 is been generated during the first execution of line 6.

Figure 4:
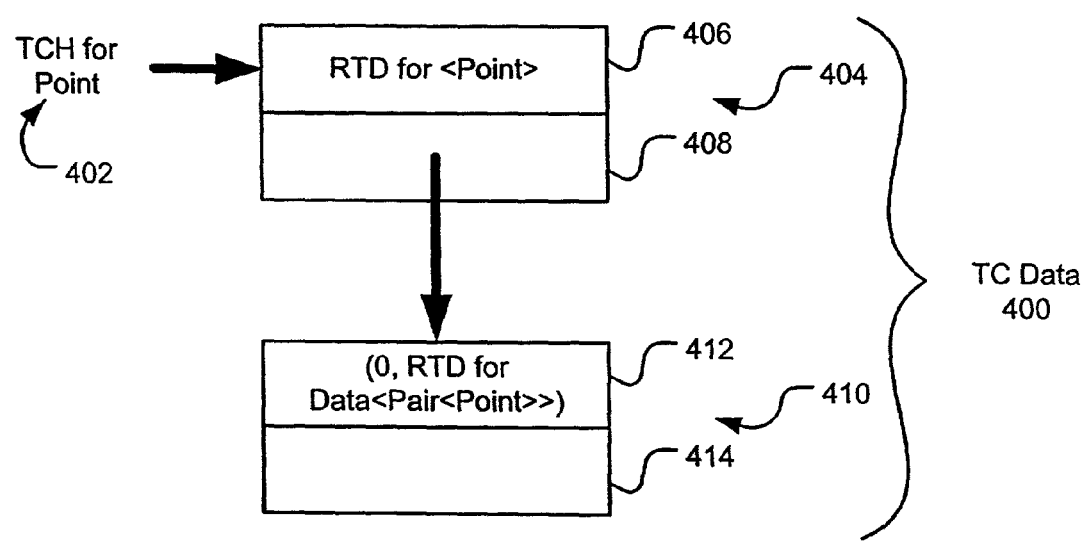
FIG. 4 illustrates an exemplary TC data structure corresponding to the <Point> typing context of Code Sample No. 1 in an embodiment of the present invention.

FIG. 4 illustrates an exemplary TC data structure corresponding to the <Point> typing context of Code Sample No. 1 in an embodiment of the present invention. Referring again to the Code Sample No. 1, the TCH 402 for <Point>, which references the TC data structure 400, is passed into the generic method Routine<T>() as a hidden variable. In the illustrated embodiment, the TC data structure 400 is configured as a linked list, although other data structures may be employed in alternative embodiments of the present invention. The RTD stored in the first field 406 of the first (non-indexed) slot 404 of the TC data structure 400 defines the typing context of the TC data structure 400. The second field 408 of the first slot 404 references the next (indexed) slot 410 in the TC data structure 400.

The indexed slot 410 stores the RTD corresponding to the first indexed code point in the Code Sample No. 1 (i.e., at line 6). Within the <Point> typing context, the RTD for the type "Data<Pair<Point>>" is stored in first field 412 of the slot 410. The second field 414 of the slot 410 is used to indicate the next slot in the table; however, in the example, there are no additional TC-relevant-code-points within the <Point> typing context, so the second field 414 stores NULL.

Once the second slot 410 of the TC data structure 400 has been generated, all subsequent executions within the <String> typing context of the corresponding code point at line 6 may reference the RTD in the TC data structure 400 instead of retrieved the RTD from the global hash table. See the discussion relating to FIG. 6 for more details on the reuse of RTDs.

Figure 5:
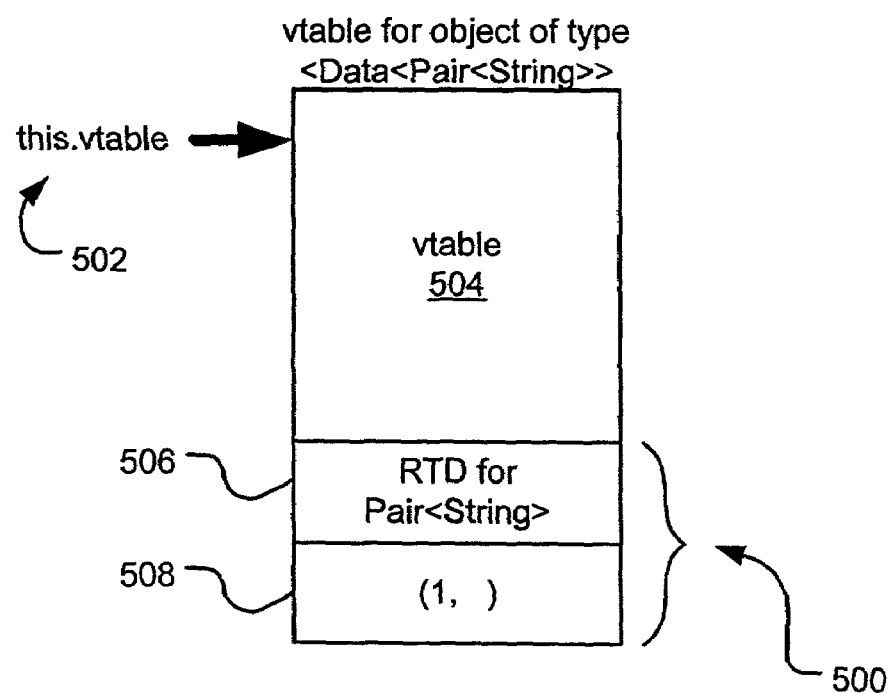
FIG. 5 illustrates an exemplary virtual table having TC data appended thereto in an embodiment of the present invention.

FIG. 5 illustrates an exemplary virtual table having TC data appended thereto in an embodiment of the present invention. At instantiation of an object of a generic type (e.g., an object of type Data<T>) with a given type parameter, a reference to the appropriate TC data is set in the object. This reference may take many forms, including a new pointer in the standard object structure.

In one embodiment of the present invention, however, an already existing pointer in the standard object structure (i.e., the vtable pointer 502) is used to point to a combination of the vtable 504 and the TC data structure 500 for the object's type, as shown in FIG. 5. Therefore, the typing context information of the object is carried along with the object regardless of the typing context in which a given TC-relevant-code-point is executing. Note that the vtable 504 and typing context slots 506 and 508 appear to be drawn as contiguous slots; however, it should be understood that the vtable 504 and the TC data structure 500 may be dynamically configured to allow expansion of the typing context data 500. For example, the typing context slots may be coupled by pointers, such as in a linked list, a binary tree, or another efficient expandable data structure.

The slot 506 stores the RTD for the type parameter used in allocating the object in line 6 of the Code Sample No. 1, which is "Pair<String>". The RTD for Pair<String> is retrieved from the global table of RTDs, which may be generated when the source language code is compiled into intermediate language code. In one embodiment, the string "Pair<String>" is used as a hash key to locate and retrieve the RTD for "Pair<String>" from a global hash table.

The slot 508 is allocated in correspondence with the first TC-relevant-code-point encountered at line 6 during execution. Because the first and only TC-relevant-code-point in the program allocates an object of type <Data<Pair<String>>, which has its RTD defined in the TC data structure referenced by the TCH for <String>, the indexed slot 508 corresponding to this code point is empty.

Figure 6A:
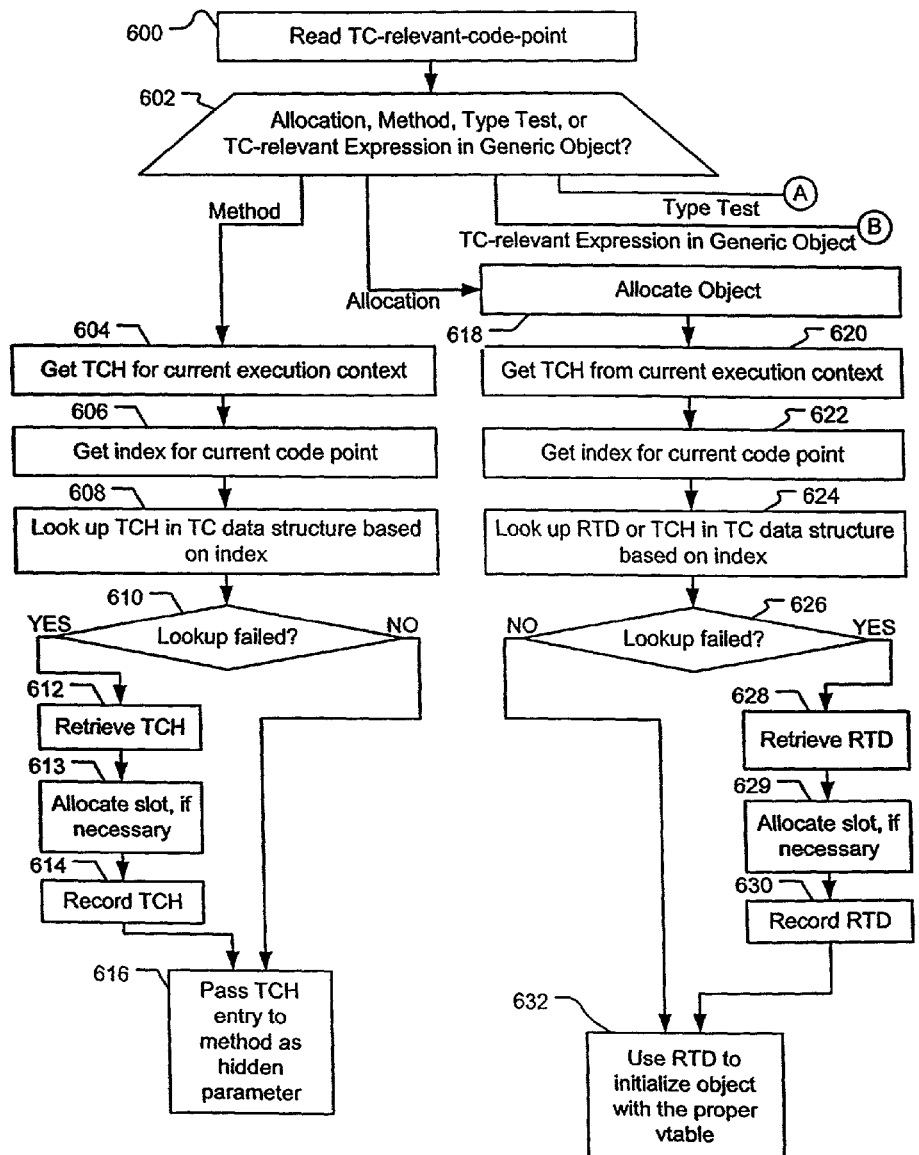
FIGS. 6A and 6B illustrate operations for processing a TC-relevant code point in an embodiment of the present invention.
Figure 6B:
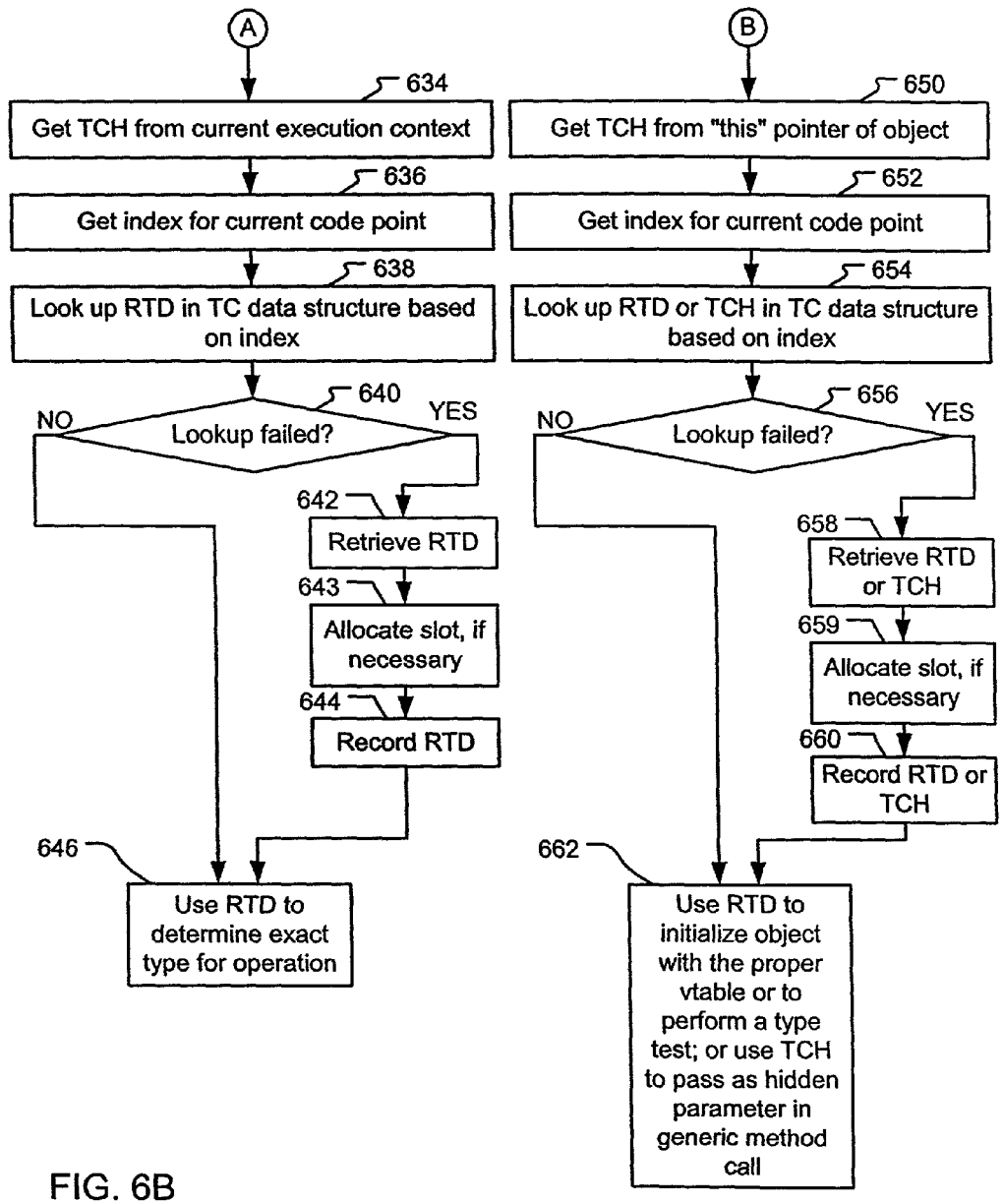

FIGS. 6A and 6B illustrate operations for processing a TC-relevant code point in an embodiment of the present invention. A read operation 600 encounters a TC-relevant-code-point in a received program of intermediate language code. A decision operation 602 determines whether the encountered code point represents (1) allocation of a generic object; (2) a call to a generic method; (3) a type test on a generic object; or (4) any TC-relevant expression within an instance of a generic class (i.e., "a generic object"). Note: The first three options are expressions outside of the scope of an instance of a generic object (e.g., an expression associated direction with the typing context identified from the stack).

If the decision operation 602 determines that the code point represents a call to a generic method, a TCH operation 604 retrieves the TCH for the current typing context from the stack. An indexing operation 606 determines the index for the current code point, which is determined as the program is executed. A look up operation 608 examines an indexed slot in the TC data structure referenced by the TCH, based on the index determined in the indexing operation 606.

A decision operation 610 determines whether the look up operation 608 fails (e.g., the indexed slot has not yet been allocated or is empty). If the look up operation 608 fails, the new TCH for the code point is retrieved, based on the typing context of the method being called, from a global hash table in a computing operation 612. An allocation operation 613 allocates an indexed slot in the TCH data structure, if necessary. The TCH for the code point is recorded in the indexed slot in a recording operation 614. If the look up operation 610 was successful or after the new TCH has been retrieved and recorded in the TC data structure, the new TCH is passed into the generic method as a hidden parameter. Within the generic method, the new TCH may be used for other TCH-relevant-points within the generic method to provide typing context data executed therein.

If the decision operation 602 determines that the code point represents an allocation of a generic object, an allocation operation 618 allocates the object. A retrieval operation 620 retrieves the TCH for the current typing context from the stack. An indexing operation 622 determines the index for the current code point, which is determined as the program is executed. A look up operation 624 examines an indexed slot in the TC data structure referenced by the TCH, based on the index determined in the indexing operation 622.

A decision operation 626 determines whether the look up operation 624 fails (e.g., the indexed slot has not yet been allocated or is empty). If the look up operation 624 fails, a new RTD for the code point is retrieved, based on the typing context of the allocated generic object, from a global hash table in a computing operation 628. For example, the RTD for Pair<String> may be retrieved from a global hash table of RTD. An allocation operation 629 allocates a new indexed slot in the TCH data structure, if necessary. A recording operation 630 records the retrieved RTD in the indexed slot. If the look up operation 626 was successful or after the new RTD has been retrieved and recorded in the TC data structure, the RTD is then used to initialize the vtable for the allocated object in an initialization operation 632. For example, the RTD indicates the exact type of the object, allowing the generic code to initialize the object with the appropriate vtable (which corresponds to the exact type of the object). Within the generic method, the new TCH may be used for other TCH-relevant-points within the generic method to provide typing context data executed therein.

If the decision operation 602 determines that the code point represents a type test or other operation that requires access to an RTD, a retrieval operation 634 retrieves the TCH for the current typing context from the stack. An indexing operation 636 determines the index for the current code point, which is determined as the program is executed. A look up operation 638 examines an indexed slot in the TC data structure referenced by the TCH, based on the index determined in the indexing operation 636.

A decision operation 640 determines whether the look up operation 638 fails (e.g., the indexed slot has not yet been allocated or is empty). If the look up operation 638 fails, a new RTD for the code point is retrieved, based on the typing context of the allocated generic object, from a global hash table in a computing operation 642. For example, the RTD for Pair<String> may be retrieved from a global hash table of RTD. A creation operation 643 creates a new indexed slot in the TCH data structure, if necessary. A recording operation 644 records the retrieved RTD in the indexed slot. If the look up operation 638 was successful or after the new RTD has been retrieved and recorded in the TC data structure, the RTD is then used in operation 646 to complete the type test or other operation at the code point.

If the decision operation 602 determines that the code point represents a call to an instance method of an object of a generic class, a TCH operation 650 retrieves the TCH for the current typing context using the "this" pointer of the object. For example, in one embodiment where the TC data structure is appended to the virtual table of the object, the TC data structure may be obtained using a computation "this->vtble->TCData[i]", where "this->vtble" is a reference to the vtable of the generic object, "TCData" references the TC data that is recorded after the typical vtable data in the vtable, and "[i]" specifies the i$^{th}$ slot in the TCData portion of the vtable. An indexing operation 652 determines the index for the current code point, which is determined as the program is executed. A look up operation 654 examines an indexed slot in the TC data structure referenced by the TCH, based on the index determined in the indexing operation 652.

A decision operation 656 determines whether the look up operation 654 fails (e.g., the indexed slot has not yet been allocated or is empty). If the look up operation 654 fails, the new RTD or TCH for the code point is retrieved, based on the typing context of the TC-relevant expression, from a global hash table in a computing operation 658. An allocation operation 659 allocates an indexed slot in the TC data structure, if necessary. The RTD or TCH for the code point is recorded in the indexed slot in a recording operation 660. If the look up operation 654 was successful or after the new RTD or TCH has been retrieved and recorded in the TC data structure, the RTD or TCH is used by the TC-relevant expression. For example, the RTD can be used to allocate an instance of a generic class or to perform a type test in the current typing context. Alternatively, the TCH can be passed into a generic method within the generic object as a hidden parameter.

It should be understood that "computing" the TC data (e.g., RTD or TCH) can involve without limitation either generating a new TC data associated with the TC-relevant-code-point (e.g., retrieving it from a global hash table) or looking up already generated TC data in an existing slot of a TC data structure. Typically, the lookup option is faster than the generation option because fewer operations are required to obtain the proper TC data using a look up operation. Therefore, the lookup option is attempted first in an embodiment of the present invention.

Figure 7:
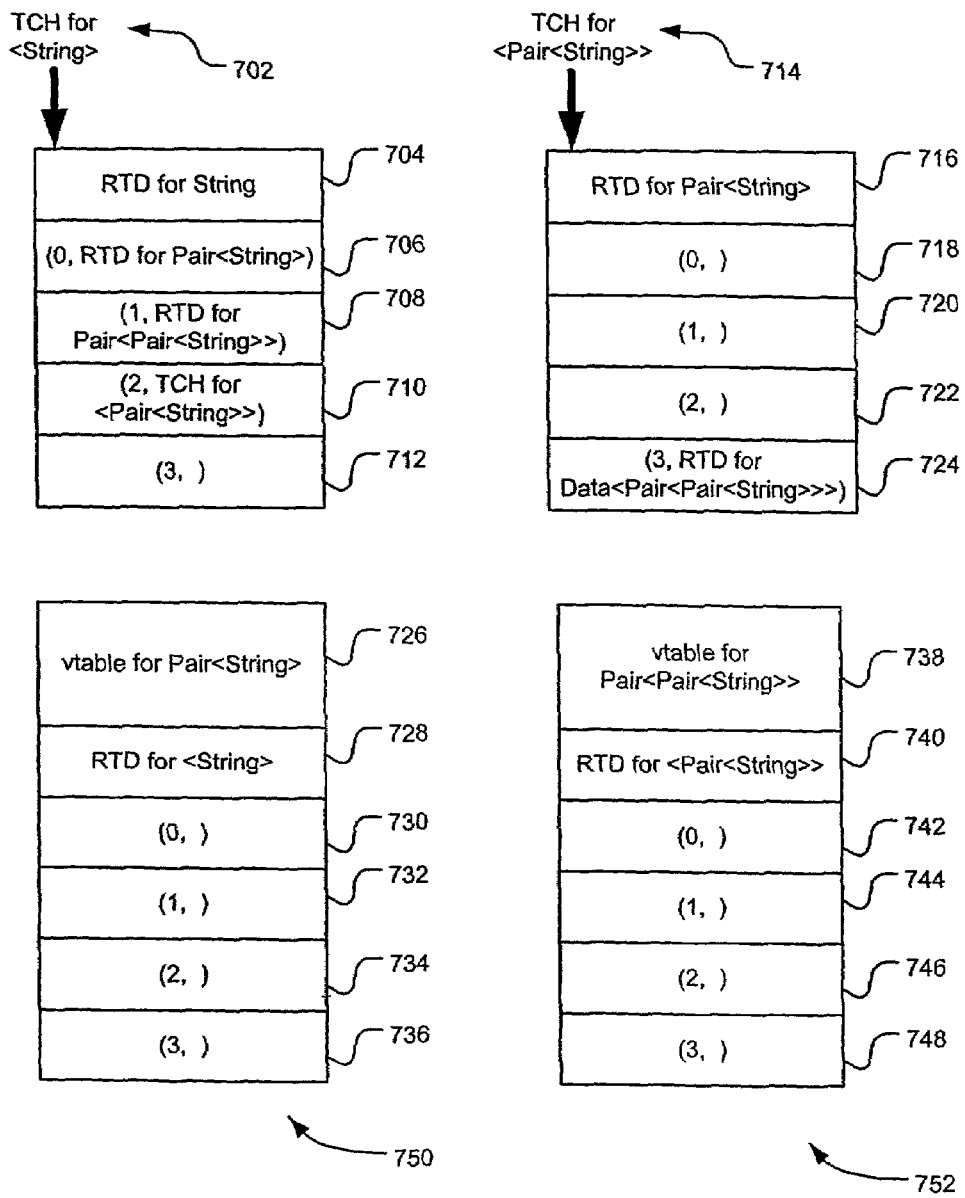
FIG. 7 illustrates TC data structures according to Code Sample No. 2 in an embodiment of the present invention.

FIG. 7 illustrates TC data structures according to Code Sample No. 2 below in an embodiment of the present invention. The TC data structures 700 for <String> and Pair<String>, and vtables for the types Pair<String> and <Pair<Pair<String>> are shown, assuming the program has executed each TC-relevant-code-point. Another vtable for Data<Pair<String>> is not shown, (although by the allocation of the slots with index=3, it is presumed that a vtable for an object of that type has been allocated at line 10).

---

Code Sample No. 3

```
void RoutineA<T>(T x)
{
    Pair<T> y = new Pair<T>(x);
    Pair<Pair<T>> z = Pair<Pair<T>>(y);
    RoutineB<Pair<T>>(x);
}
void RoutineB<T>(Pair<T>x)
{
    Data<Pair<T>> w = new Data<Pair<T>>(x);
}
main( )
{
    RoutineA<String>("String");
}
```

---

Turing now to Code Sample 3 above, there are four TC-relevant-code-points (lines 3, 4, 5, and 10). The code points in lines 3, 4, and 10 are mapped to RTDs in appropriate TC data structures, whereas the code point in line 5 is mapped to a TCH in an appropriate TC data structure. There will be a TCH for <String> and a TCH for Pair<String> in the stack, each of which will reference TC data structures with four slots, one slot for each TC-relevant-code-point. Each slot will be allocated as the corresponding TC-relevant-code-point is executed. However, only the slots that are relevant to execution of a TC-relevant-code point in a given typing context will be filled in.

Therefore, a TCH 702 for Point references a TC data structure comprising slots 704-712. to The non-indexed slot 704 stores the RTD for the typing context <String>. The indexed slot 706 If stores the RTD for Pair<String> in correspondence with the code point with index=0 (i.e., line 3). The indexed slot 708 stores the RTD for Pair<Pair<String>> in correspondence with the code point with index=1 (i.e., line 4). The indexed slot 710 stores the RTD for Pair<String> in correspondence with the code point with index=2 (i.e., line 5). However, the code point with index=3 (i.e., line 10) is never executed within the <String> typing context. Therefore, the slot is allocated but is not filled in.

A TCH 714 for Pair<String> references a TC data structure comprising slots 716-724. The non-indexed slot 716 stores the RTD for the typing context <Pair<String>>. The code point with indices equaling 0, 1 and 2 are never executed within the typing context <Pair<String>> and, therefore, the corresponding slots are allocated but not filled in. The indexed slot 724, however, stores the RTD for Data<Pair<Pair<String>>> in correspondence with the code point with index=3 (i.e., line 10), because the code point at line 10 is executed within the <Pair<String>> typing context.

The vtable structure 750 includes the normal vtable 726 for type Pair<String>. In addition, the vtable structure 750 also includes an RTD for the type parameter <String> in non-indexed slot 728. Indexed slots 730-736 are allocated but empty because the corresponding code points are not executed within the scope of an object of type Pair<String>.

The vtable structure 752 includes the normal vtable 738 for type Pair<String>. In addition, the vtable structure 752 also includes an RTD for the type parameter <Pair<String>> in non-indexed slot 740. Indexed slots 742-748 are allocated but empty because the corresponding code points are not executed within the scope of an object of type Pair<Pair<String>>.

It should be understood, however, if one of the generic classes included code, for example, a call to a generic method (i.e., a TC-relevant-code-point, such as InternalMethodC<T>() in generic class Pair<T>), all of the TC data structures would be allocated a new indexed slot upon execution of the code point. The new indexed slot in the vtable structure 750 for Pair<String>would be filled in with the TCH for the called generic method.

It should also be understood that embodiments of the present invention implement his generic types supporting multiple type parameters (e.g., foo<T, U>). The number of type parameters supported by a generic type is referred to as the "arity" of the typing context. Referring to the vtable in FIG. 5, if the generic class for the object supported two type parameters, there would be two non-indexed slots positioned between the vtable 504 and the first indexed slot 508.

In addition, TC data structures may be optimized according to arity to reduce the number of empty slots in each TC data structure. By observing that TCH's for typing contexts of different arity are mutually exclusive (i.e., cannot be relevant at the same code point), different categories of indices can be maintained for code points having different arity. For example, indices may be assigned to TC-relevant-code-points in the program in categories based on the number of type parameters in the relevant expression. So, as TC-relevant-code-points having one open-type parameter (e.g., <T>) are encountered, they are indexed 0, 1, 2, 3, . . . Likewise, as TC-relevant-code-points having two open-type parameters (e.g., <T, U>) are encountered, they are also indexed 0, 1, 2, 3, . . . , irrespective of the numbering for single parameter code points. Code points may be indexed according to this scheme for any number of type parameters.

Therefore, for example, the double parameter TC data structures form a mutually exclusive set of TC data slots to those of the single parameter code points. According to the "arity" optimization, it is clear that code points having different "arity" characteristics may share the same index because the disparate code points map into different categories of tables, thereby reducing the overall size of each TC data structure.

Other optimizations are also available in accordance with the present invention. If two distinct code points involve the same RTD computation (e.g., both code points relate to an RTD for Data<Pair<String>>), the same index may be assigned to both code points. As such, a slot allocation is avoided for all TC data structures because a slot is reused for the duplicated index.

In yet another optimization, the indexing scheme supplemented by annotations for each TCH to achieve more precise categories of typing contexts. One embodiment of such an optimization involves indexing TC data structures according a code point index per containing class, per containing method, or per containing assembly, where assembly is a predefined set of code and/or data received by the execution engine. For example, rather than allocating TCHs for <String> and Pair<String> in FIG. 7, TCHs would be allocated for RoutineA<String>, which would have three indexed slots for the code points at lines 3, 4 and 5, and RoutineB<Pair<String>>, which would have one indexed slot for the code point at line 10.

Figure 8:
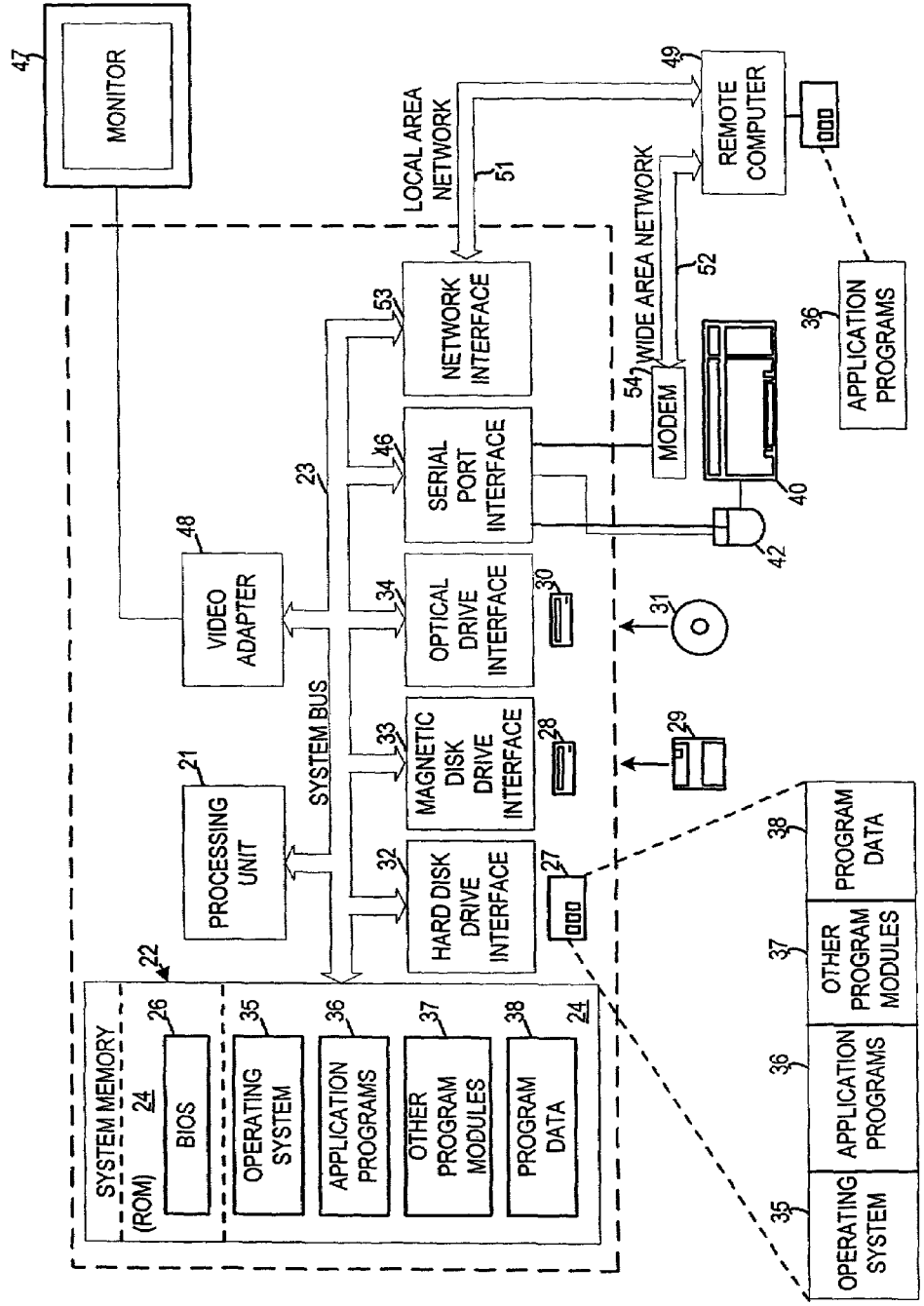
FIG. 8 illustrates an exemplary system useful for implementing an embodiment of the present invention.

The exemplary hardware and operating environment of FIG. 8 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a execution engine efficiently supports parametric polymorphism in a dynamic execution environment may be incorporated as part of the operating system 35, application programs 36, or other program modules 37. Source language code, intermediate language code, a global hash table, and TC data structures may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A computer program product comprising a computer-readable storage medium encoding a computer program for executing on a computer system a computer process for dynamically generating typing context data associated with a typing-context-relevant-code-point being executed within a typing context in a dynamic execution environment, the computer process comprising:

encountering the typing-context-relevant-code-point in the typing context during execution of the program;

identifying a typing context handle associated with the typing context, the typing context handle referencing a typing context data structure associated with the typing context;

computing the typing context data associated with the typing-context-relevant-code-point;

dynamically allocating a field in the typing context data structure associated with the typing-context-relevant-code-point, the field describing the exact type of the typing-context-relevant-code-point in the typing context, wherein the typing context data structure is not statically pre-allocated; and recording the typing context data in the field of the typing context data structure.

2. The computer program product of claim 1 wherein the typing context-relevant-code-point executes a type test on an instance of a generic class, the typing context data includes a resource type descriptor defining the exact type of the instance, and the computer process further comprises:

performing the type test based on the resource type descriptor associated with the typing-context-relevant-code-point.

3. The computer program product of claim 1 wherein the typing context-relevant-code-point executes an allocation of an instance of a generic class, the typing context data includes a resource type descriptor defining the exact type of the instance, and the computer process further comprises:

creating the instance of the generic class based on the resource type descriptor associated with the typing-context-relevant-code-point, wherein the instance is of the exact type.

4. The computer program product of claim 1 wherein the typing context-relevant-code-point calls a generic method, the typing context data includes another typing context handle, and the computer process further comprises:

passing the other typing context handle referencing the typing context data to the generic method as a hidden parameter.

5. The computer program product of claim 1 wherein the identifying operation comprises:

retrieving the typing context handle from a stack frame.

6. The computer program product of claim 1 wherein the typing context-relevant-code-point is executed within an instance of a generic class and the identifying operation comprises:

retrieving a first pointer to the instance; and retrieving the typing context handle via a second pointer, a second pointer being relative to the first point and referencing the typing context handle associated with the instance.

7. The computer program product of claim 1 wherein the computing operation comprises:

retrieving the typing context data associated with the typing-context-relevant-code-point from a global hash table.

8. The computer program product of claim 1 wherein the encountering operation comprises:

assigning an index to the typing-context-relevant-code-point.

9. The computer program product of claim 8 wherein the allocating operation comprises:

allocating the field in the typing context data structure, in accordance with the index.

10. The computer program product of claim 8 wherein the index is assigned based on the "arity" of the typing-context-relevant-code-point.

11. The computer program product of claim 8 wherein the index is assigned based on a category associated with the typing-context-relevant-code-point.

12. The computer program product of claim 11 wherein the category is assigned on a per-containing class basis.

13. The computer program product of claim 11 wherein the category is assigned on a per-containing method basis.

14. The computer program product of claim 11 wherein the category is assigned on a per-containing assembly basis.

15. An execution engine stored on a computer-readable storage medium for executing parametrically polymorphic code and dynamically generating typing context data associated with a typing-context-relevant-code-point being executed within a typing context in a dynamic execution environment, the execution engine comprising:

a read module configured to encounter the typing-context-relevant-code-point in the typing context during execution of the program;

a handle module configured to identify a typing context handle associated with the typing context, the typing context handle referencing a typing context data structure associated with the typing context;

a computation module configured to compute the typing context data associated with the typing-context-relevant-code-point;

an allocation module configured to dynamically allocate a field in the typing context data structure associated with the typing-context-relevant-code-point, the field describing the exact type of the typing-context-relevant-code-point in the typing context, wherein the typing context data structure is not statically pre-allocated; and a recording module configured to record recording the typing field of the typing context data structure.

16. A method of dynamically generating typing context data associated with a typing-context-relevant-code-point being executed within a typing context in a dynamic execution environment, the method comprising:

encountering the typing-context-relevant-code-point in the typing context during execution of the program;

identifying a typing context handle associated with the typing context, the typing context handle referencing a typing context data structure associated with the typing context;

computing the typing context data associated with the typing-context-relevant-code point;

dynamically allocating a field in the typing context data structure associated with the typing-context-relevant-code-point, the field describing the exact type of the typing-context-relevant-code-point in the typing context, wherein the typing context data structure is not statically pre-allocated; and recording the typing context data in the field of the typing context data structure.

* * * * *

UNITED STATES PATENT AND TRADEMARK OFFICE
CERTIFICATE OF CORRECTION

| | | |
|---|---|---|
| PATENT NO. | : 7,346,901 B2 | Page 1 of 1 |
| APPLICATION NO. | : 10/025270 | |
| DATED | : March 18, 2008 | |
| INVENTOR(S) | : Donald Robert Syme et al. | |

It is certified that error appears in the above-identified patent and that said Letters Patent is hereby corrected as shown below:

In column 20, line 38, in Claim 2, delete "typing context" and insert -- typing-context --, therefor.

In column 20, line 46, in Claim 3, delete "typing context" and insert -- typing-context --, therefor.

In column 20, line 55, in Claim 4, delete "typing context" and insert -- typing-context --, therefor.

In column 20, line 65, in Claim 6, delete "typing context" and insert -- typing-context --, therefor.

In column 22, line 16, in Claim 15, after "typing" insert -- context data in the --.

In column 22, line 29, in Claim 16, delete "code point;" and insert -- code-point; --, therefor.

Signed and Sealed this

Fifteenth Day of February, 2011

David J. Kappos
*Director of the United States Patent and Trademark Office*